US012762198B2

(12) United States Patent
Nomula et al.

(10) Patent No.: US 12,762,198 B2
(45) Date of Patent: Oct. 13, 2026

(54) SYSTEM AND METHOD FOR PRESENTING TARGETED CONTENT

(71) Applicant: Voicemonk, Inc., Sunnyvale, CA (US)

(72) Inventors: Jagadeshwar Nomula, Sunnyvale, CA (US); Vinesh Gudla, Pleasanton, CA (US); Durga Prasad Velamuri, Fremont, CA (US)

(73) Assignee: Voicemonk, Inc., Sunnyvale, CA (US)

( * ) Notice: Subject to any disclaimer, the term of this patent is extended or adjusted under 35 U.S.C. 154(b) by 0 days.

(21) Appl. No.: 19/313,908

(22) Filed: Aug. 29, 2025

(65) Prior Publication Data

US 2025/0384467 A1 Dec. 18, 2025

Related U.S. Application Data

(63) Continuation-in-part of application No. 18/474,130, filed on Sep. 25, 2023, now Pat. No. 12,548,048,
(Continued)

(51) Int. Cl.
*G06Q 30/00* (2023.01)
*G06F 16/9535* (2019.01)
(Continued)

(52) U.S. Cl.
CPC ...... *G06F 16/9558* (2019.01); *G06F 16/9535* (2019.01); *G06F 16/958* (2019.01);
(Continued)

(58) Field of Classification Search
CPC ............... G06Q 30/0269; G06Q 30/02; G06Q 30/0255; G06Q 30/0277; G06Q 50/01;
(Continued)

(56) References Cited

U.S. PATENT DOCUMENTS

2012/0158499 A1* 6/2012 Banadaki ........... G06Q 30/0254 705/14.52
2013/0138662 A1* 5/2013 He .................... G06F 16/24575 707/E17.014
(Continued)

*Primary Examiner* — Meredith A Long
(74) *Attorney, Agent, or Firm* — Kumar Maheshwari; Mahesh Law Group PC

(57) ABSTRACT

A computer-implemented system for presenting targeted content is provided. The system comprises a processor configured to obtain user permission and access profile attributes and friend attributes from a social-network interface, generate, for each person, an identifier from attributes including name, date-of-birth, and location, and store, keyed by the identifier, user search and browsing actions and external records ingested via a distributed data pipeline. Further, the processor is configured to store conversational dialogues as questions and answers using sequence-to-sequence algorithms, or as parent nodes and responses as child nodes of a graph formed on an inverted index. Further, the processor is configured to determine a purchase-funnel stage for the identifier using a classifier trained on search keywords, domains, and page categories, select an advertisement ranked based on revenue, user preference, and context, and generate multi-stage advertisement messages corresponding to discovery, consideration, and action.

20 Claims, 10 Drawing Sheets

Related U.S. Application Data which is a continuation of application No. 17/484,779, filed on Sep. 24, 2021, now Pat. No. 11,769,175, application No. 19/313,908 is a continuation-in-part of application No. 17/232,168, filed on Apr. 16, 2021, said application No. 17/484,779 is a continuation of application No. 15/441,239, filed on Feb. 24, 2017, now Pat. No. 11,144,964, which is a continuation-in-part of application No. 15/391,837, filed on Dec. 27, 2016, now abandoned, which is a continuation-in-part of application No. 15/356,512, filed on Nov. 18, 2016, now Pat. No. 11,068,954, said application No. 17/232,168 is a continuation of application No. 15/245,208, filed on Aug. 24, 2016, which is a continuation of application No. 13/089,772, filed on Apr. 19, 2011, now abandoned.

(60) Provisional application No. 62/318,762, filed on Apr. 5, 2016, provisional application No. 62/275,043, filed on Jan. 5, 2016, provisional application No. 62/257,722, filed on Nov. 20, 2015, provisional application No. 61/400,663, filed on Aug. 2, 2010.

(51) Int. Cl.

| | |
|---|---|
| ***G06F 16/955*** | (2019.01) |
| ***G06F 16/958*** | (2019.01) |
| ***G06Q 10/40*** | (2026.01) |
| ***G06Q 10/42*** | (2026.01) |
| ***G06Q 30/02*** | (2023.01) |
| ***G06Q 30/0241*** | (2023.01) |
| ***G06Q 30/0251*** | (2023.01) |
| ***H04L 41/22*** | (2022.01) |
| ***H04L 67/02*** | (2022.01) |
| ***H04L 67/50*** | (2022.01) |

(52) U.S. Cl.

CPC ............ *G06Q 10/40* (2026.01); *G06Q 10/42* (2026.01); *G06Q 30/02* (2013.01); *G06Q 30/0255* (2013.01); *G06Q 30/0269* (2013.01); *G06Q 30/0277* (2013.01); *H04L 41/22* (2013.01); *H04L 67/02* (2013.01); *H04L 67/535* (2022.05)

(58) Field of Classification Search

CPC ............ G06F 16/9535; G06F 16/9558; G06F 16/958; H04L 41/22; H04L 67/02; H04L 67/535

See application file for complete search history.

(56) References Cited

U.S. PATENT DOCUMENTS

| | | | | |
|---|---|---|---|---|
| 2017/0169476 | A1* | 6/2017 | Nomula | G06N 3/006 |
| 2021/0233121 | A1* | 7/2021 | Nomula | G06Q 30/02 |
| 2025/0240256 | A1* | 7/2025 | Fox | G06F 40/35 |
| 2025/0292027 | A1* | 9/2025 | Peshave | G06N 3/08 |

* cited by examiner

SYSTEM AND METHOD FOR PRESENTING TARGETED CONTENT

CROSS-REFERENCE TO RELATED APPLICATION

This application is a continuation-in-part of application Ser. No. 18/474,130, filed Sep. 25, 2023, which is a continuation of application Ser. No. 17/484,779, filed Sep. 24, 2021, which is a continuation of application Ser. No. 15/441,239, filed Feb. 24, 2017, which is a continuation-in-part of application Ser. No. 15/391,837, filed Dec. 27, 2016, which is a continuation-in-part of application Ser. No. 15/356,512, filed Nov. 18, 2016, which claims benefit of provisional Application Nos. 62/257,722, 62/275,043, and 62/318,762, filed Nov. 20, 2015, Jan. 5, 2016, and Apr. 5, 2016, respectively. Further, the present application is also a continuation-in-part of application Ser. No. 17/232,168, filed Apr. 16, 2021, which is a continuation of application Ser. No. 15/245,208, filed on Aug. 24, 2016, which is a continuation of application Ser. No. 13/089,772, filed on Apr. 19, 2011, which claims benefit of provisional Application No. 61/400,663, filed on Aug. 2, 2010. All of the foregoing applications are incorporated by reference herein.

BACKGROUND

Field of Invention

Embodiments relate generally to the field of presenting targeted content to users of a website and, more particularly but not exclusively, to presenting targeted content to the users based on information aggregated from one or more online social networking platforms.

Discussion of Related Art

It is a well-known fact that penetration of internet has increased substantially, and continues to increase. With increased penetration of the internet, users have started using internet for a gamut of reasons. Internet is being used for conducting research that helps in taking decisions, expressing views and opinions, and buying products and services, among other reasons.

A large number of web portals enable users to buy goods and services online. Some web portals allow users to only search or browse their inventory online and facilitate buying of goods and services available in their inventory. On the other hand, some web portals present targeted content, such as advertisements, recommendations or suggestions to a user on what goods or services the user may wish to buy.

One of the commonly adopted methodologies for presenting targeted content is collaborative filtering. Collaborative filtering is used with machine learning algorithms to present targeted content to users of the web portal. Amazon is one such web portal that appears to use collaborative filtering to group users who have carried out similar actions, and provides recommendations thereafter. It has been often observed that, sometimes, unrelated recommendations are presented to the user, when recommendations are provided based on the group a user pertains to, which has been algorithmically determined by adopting collaborative filtering algorithm. Additionally, the instant approach may not be ideal when a user is using the web portal for purchasing gifts for other persons. While purchasing gifts, the preference of the person receiving the gift is of importance. However, the instant approach does not appear to be designed to consider the preference of the person who will be receiving the gift into consideration for providing recommendations to the user purchasing the gifts.

Another approach for presenting targeted content to the user is by using information gathered from an online social networking platform, which the user might be using. A website, www.goodreads.com, is one such example that appears to recommend books to its users based on the information corresponding to the user that is gathered from an online social networking platform (www.facebook.com), which the user might be using. In the instant approach, the user is allowed to log into the web portal using his online social networking authentication credentials. After the user provides his online social networking authentication credentials, the user is asked to provide access to information that may be used to give recommendations. Once the user grants rights to access the information, the information is used to provide recommendation to the user. It shall be noted that, in the instant approach, information corresponding to the user is gathered from only one social networking platform, which the user is using. However, it has been observed that generally a single user socializes by using more than one online social networking platform. For instance, a user may use LinkedIn Network to socialize and increase acquaintances within his professional work. The same user may also use Facebook to interact and stay in touch with his friends. Additionally, the user may be using location based social networking platforms, such as, Foursquare to meet his friends at a given location. The interactions in each of these social networks are isolated from each other and there are no clear ways to aggregate the interactions of a user across social networks and share the information to applications, which can leverage this information to enhance the relevance of targeted content presented to the user.

In light of the foregoing discussion, there is a need for a technique to improve relevancy of the targeted content presented to users. Further, the technique shall enable aggregation of information corresponding to users across online social networking platforms. Furthermore, the technique shall enable sharing of the aggregated information to applications that can leverage the information to enhance the relevance of the targeted content presented to the user.

SUMMARY

In one aspect, a computer-implemented system for presenting targeted content is provided. The system includes an authentication module configured to obtain user permission and access profile attributes and friend attributes from a social-network interface. An identifier-generation module generates, for each person, an identifier derived from attributes including name, date-of-birth, and location. A data aggregation module stores, keyed by the identifier, user search and browsing actions and external records ingested via a distributed data pipeline. A learning module stores conversational dialogues as at least one of: questions and answers on a neural network using sequence-to-sequence algorithms, or as parent nodes and corresponding responses as child nodes of a graph formed on an inverted index. An advertisement module determines a purchase-funnel stage for the identifier using a classifier trained on search keywords, domains, and page categories, selects an advertisement ranked based on revenue, user preference, and context, and generates multi-stage advertisement messages corresponding to discovery, consideration, and action. A controller module inserts the advertisement into the conversation flow as a question to the sequence-to-sequence algorithm or as a node in the graph, and advances to a next stage when user responses satisfy stage-specific criteria. A logging component records each user-advertisement interaction keyed by the identifier.

In another aspect, a computer-implemented method for presenting targeted content is provided. The method comprises obtaining user permission and accessing profile attributes and friend attributes from a social-network interface. The method comprises generating, for each person, an identifier from attributes including name, date of birth, and location. The method comprises storing, keyed by the identifier, search and browsing actions of the user and external records ingested via a distributed data pipeline. The method comprises storing conversational dialogues as at least one of: questions and answers on a neural network using sequence-to-sequence algorithms, or as parent nodes and corresponding responses as child nodes of a graph formed on an inverted index. The method comprises determining a purchase-funnel stage for the identifier using a classifier trained on features including search keywords, domains, and page categories. The method comprises selecting an advertisement ranked based on at least revenue, user preference, and context, and generating multi-stage advertisement messages corresponding to discovery, consideration, and action. The method comprises inserting the advertisement into a conversation flow as a question to the sequence-to-sequence algorithm or into the graph, and advancing to a next stage when a user response satisfies stage-specific criteria. The method comprises recording each user-advertisement interaction keyed by the identifier.

BRIEF DESCRIPTION OF DRAWINGS

Embodiments are illustrated by way of example and not limitation in the Figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or" such that "A or B" includes "A but not B." "B but not A," and "A and B." unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Figure 1:
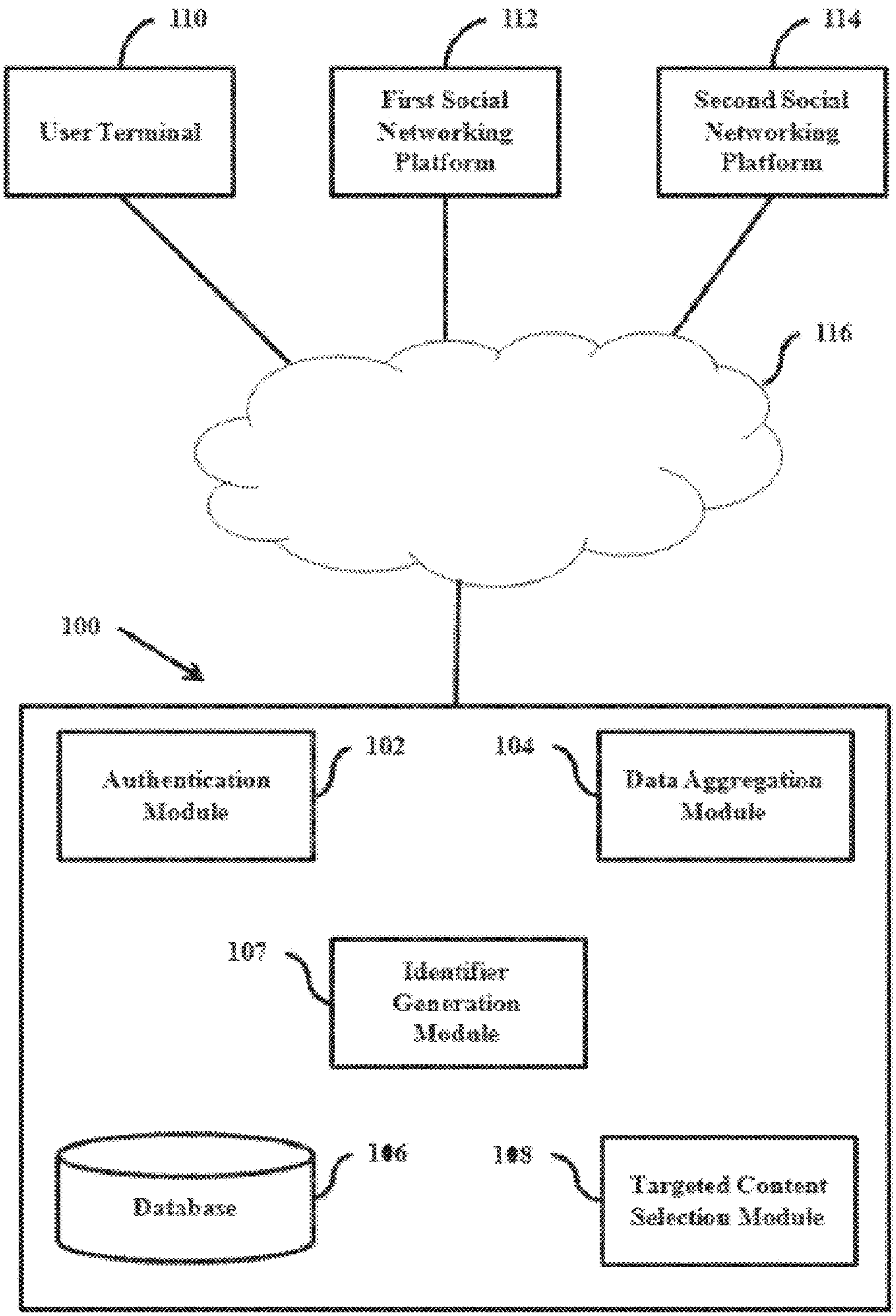
FIG. 1 is a block diagram illustrating a system 100 for presenting targeted content to users, in accordance with an embodiment.

FIG. 1 is a block diagram illustrating a system 100 for presenting targeted content to users, in accordance with an embodiment. System 100 may enable presenting targeted content, over the internet. The targeted content presented to the users, for example, can be, presenting recommendations corresponding to goods and services, which the users may wish to, buy or gift. Examples of goods and services can include, but are not limited to, gifts, books, concerts, restaurants, musical compositions, spa treatments, gadgets, clothing, pet accessories, jewelry and cosmetics. The targeted content presented to users, for example, may include, but not limited to, advertisements, links to web pages and customized layout of the website the user is visiting.

A user may use his user terminal 110 to access a website in which the targeted content is displayed to the user. The user terminal 110 can be, for example, a desktop computer, a laptop, a communication device, a personal digital assistant or a programmable consumer electronics device. The website, for example, can be an ecommerce website that enables online buying of goods and services. Alternatively, the website can be a blog or a corporate website. On the other hand, the website can be a platform that allows, for example, viewing of videos (Ex: YouTube), presentations (Ex: Slideshare), documents (Ex: Scribd) or lyrics (Ex: www.lyrics.com).

System 100 includes an authentication module 102, a data aggregation module 104, a database 106, an identifier generation module 107 and a targeted content selection module 108. The system 100 is configured to communicate with user terminals (Ex: User terminal 110) over a communication network 116. In FIG. 1, only one user terminal 110 is illustrated to simplify understanding of the embodiment. The system 100 is also configured to communicate over the communication network 116, with one or more social networking platforms. In FIG. 1 a first social networking platform 112 and a second social networking platform 114 are illustrated.

System 100 may be coupled with one or more websites in which visitors (users) to the websites are presented with targeted content. The authentication module 102 may be configured to enable users of a website to sign-in to the website, either by allowing the users to create an account in the website or by allowing signing-in using an online social networking platform (Ex: First social networking platform 112 or second social networking platform 114). If a user signs-in using the online first social networking platform 112, then the data aggregation module 104, which is configured to mine data corresponding to the user from the first social networking platform 112, extracts the data from the first social networking platform 112 after receiving permission from the user for such data mining. At least a part of the mined data is communicated to the identifier generation module 107. The identifier generation module 107 is configured to generate identifiers, using the mined data, for the user and the user's contacts present in the first social networking platform 112. Thereafter, the generated identifiers and the mined data are communicated to the database 106. The database 106 is configured to receive data from the data aggregation module 104 and the generated identifiers, and store the same for retrieval when desired. It shall be noted that the identifiers and the corresponding data are linked. Additionally, the relationship between the identifiers created for various users (and their friends) may also be created and stored. The targeted content selection module 108 is configured to query the database 106 and process the data provided by the database 106 to select content that can be presented to the user.

Figure 2:
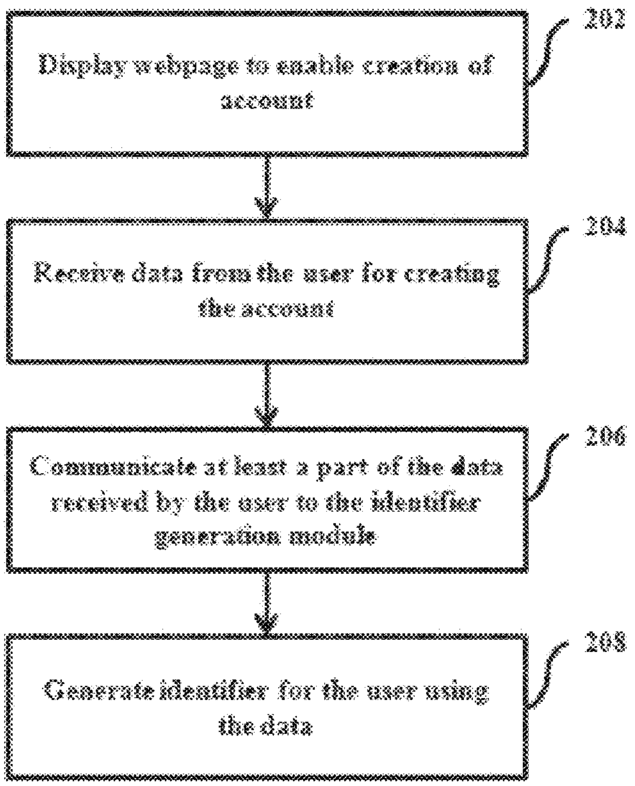
FIG. 2 is a flow chart illustrating a method for generating identifier for a user, in accordance with an embodiment.

As highlighted in the foregoing discussion, the identifier generation module 107 is configured to generate identifiers using the information provided by or information mined using permission granted by the visitor. FIG. 2 is a flow chart illustrating a method for generating identifier for a user, in accordance with an embodiment. In this embodiment, an identifier is generated for a user who creates an account in the website. At step 202, the website is displayed in the web browser of the user terminal 110. If the user does not have an account in the website, then he may create an account using an account creation web page present in the website or by using an online social networking platform. In this embodiment, the user attempts to create an account using the account creation page. The account creation page may request the user to provide information that is required to create an account. For example, the information requested may include, first name, last name, date of birth, location and email address. At step 204, the information required to create the account is received from the user. Thereafter, at least a part of the information that is required to generate an identifier for the user is communicated to the identifier generation module 107, at step 206. The identifier, for example, may be generated using information fields, such as, first name, last name, date of birth, email address and location. It shall be noted that, from the instant example, one of more information field may be added or removed to generate identifiers.

Figure 3:
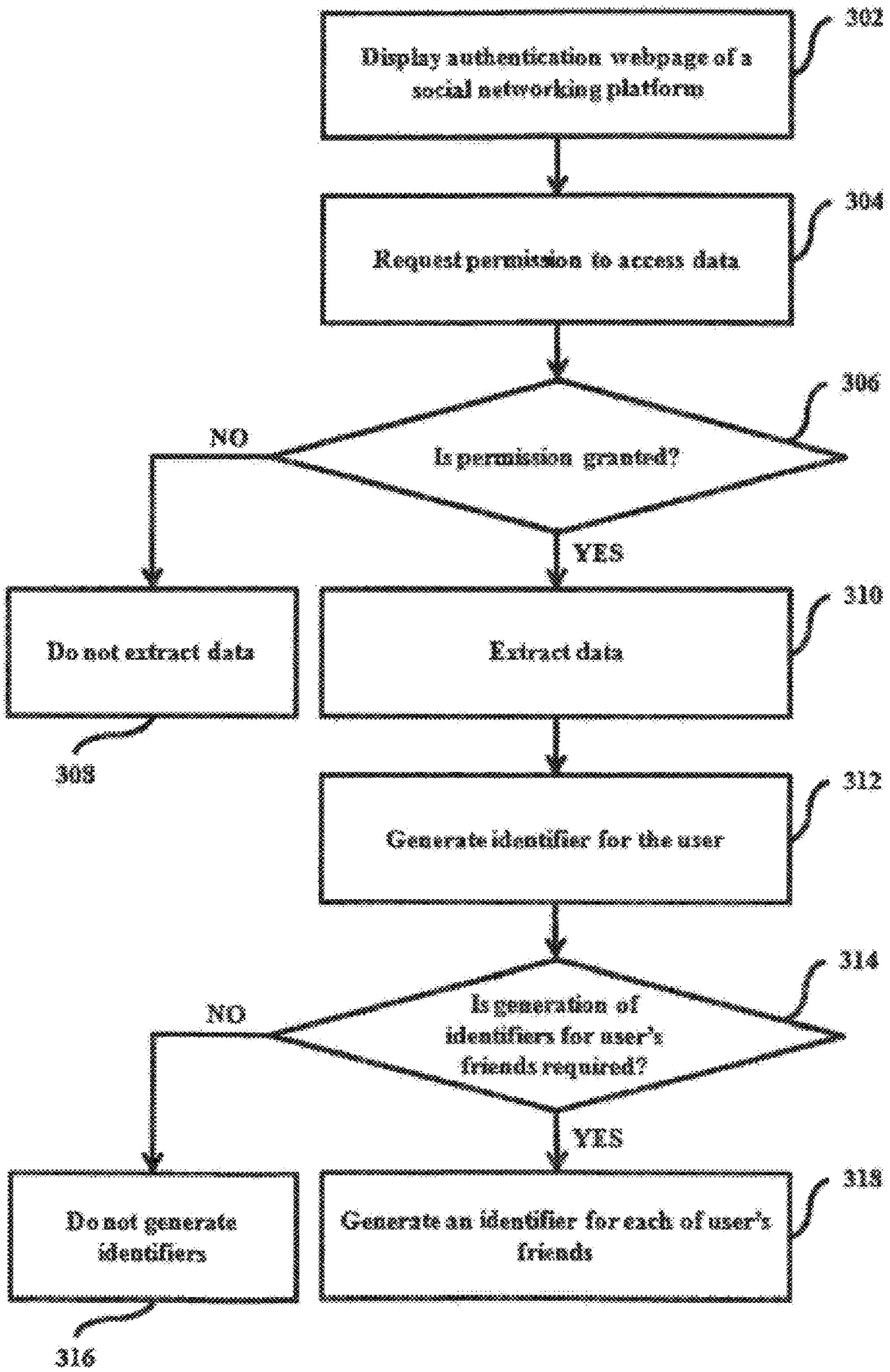
FIG. 3 is a flow chart illustrating a method for generating identifiers when a user creates an account using an online social networking platform, in accordance with an embodiment.

In the foregoing embodiment, the identifier was created using information provided by the user while creating an account using the account creation page of the website. In another embodiment, identifier for a user may be generated when the user creates an account using a social networking platform. FIG. 3 is a flow chart illustrating a method for generating identifiers when a user creates an account using an online social networking platform, in accordance with an embodiment. As mentioned earlier, a user can create an account in the website using the website's account creation page or by using an online social networking platform (Ex: Facebook). If the user chooses to create an account using the online social networking platform, then at step 302, authentication webpage of the social networking platform is displayed. The user provides the authentications credentials, and upon successful authentication, a web page seeking permission to access data corresponding to the user, from the social networking platform is displayed at step 304. The information sought to be accessed, for example, may include, user's name, date of birth, location, email address, likes, dislikes, groups, interests and feeds. Additionally, permission may be sought to access user's friends' name, date of birth, location, email address, likes, dislikes, groups, interests and feeds. If the user does not grant access, then information is not accessed. On the other hand, if the user grants access, then at step 310, data is extracted by the data aggregation module 104. At least a part of the user's data, such as user's name, date of birth, location and sex, is used to generate identifier for the user at step 312 by the identifier generation module 107. Further, if the website configured in such a way that generation of identifier for each of user's friends is desired, then at step 318, identifier for each of user's friends is generated using information that is accessible to the data aggregation module 104.

It may be noted that, as aforementioned, data aggregated from one or more social networking platforms is used by the system 100 to present targeted content to the user. Hence, when a user creates an account in the website using the website's account creation page, the system 100 may have to identify whether data, extracted from a social networking platform, corresponding to the user is already present in the database 106, and use the same to present targeted content. For example, User 1 may create an account in the website using a social networking platform (Ex: Facebook), and provide access to data corresponding to User 2, who is in User 1's online social network. After gaining access to User 2's data, the system may generate an identifier for user 2, extract data corresponding to User 2 and store the data corresponding to User 2 in the database 106. In a scenario, wherein User 2 creates an account in the website using the account creation page of the website, the system may generate an identifier for User 2. Thereafter, the system may verify whether information, aggregated from a social networking platform, corresponding to User 2 is available in the database, and use the same to present targeted content, if information is available.

In another scenario, when the system 100 gets access to data corresponding to a user from more than one social networking platform, the system 100 may have to correlate the data from the social networking platforms to a single user. For example, system 100 may be coupled with two websites, Website 1 and Website 2, which allows users to create accounts in their websites using a first social networking platform and a second social networking platform, respectively. A user, for example, User 1 may create an account using the first social networking platform in website 1. The system 100 creates an identifier for User 1, when User 1 creates an account using the first social networking platform in website 1. Additionally, User 1 may create an account using the second social networking platform in website 2. System 100 creates an identifier for User 1 upon creation of the account in website 2. Thereafter, the system 100 may compare the identifier generated and identify that the identifier are generated for a unique person. Thereafter, the system 100 aggregates the information, corresponding to User 1, extracted from both the social networking platforms, and use the information to present targeted content to User 1.

Figure 4:
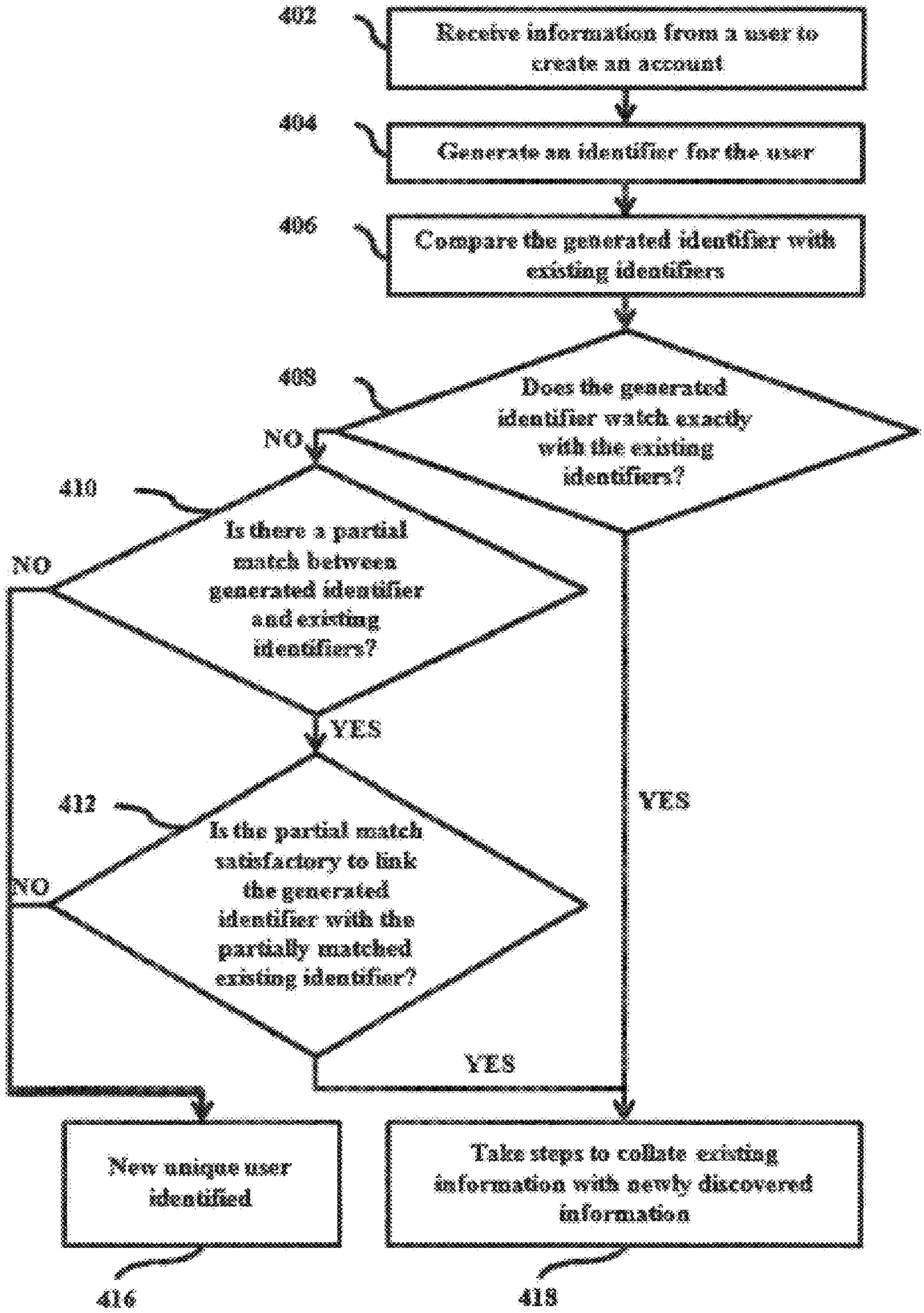
FIG. 4 is a flow chart illustrating a method for determining whether an identifier has already been created for a user whenever a new identifier has to be created, in accordance with an embodiment.

In light of the foregoing discussion, it may be noted that the system 100 may be configured to determine whether an identifier has already been created for a user whenever the system 100 generates a new identifier. FIG. 4 is a flow chart illustrating a method for determining whether an identifier has already been created for a user whenever a new identifier has to be created, in accordance with an embodiment. At step 402, the user provides information that is required to create an account in the website. The information may be provided using an account creation page in the website or by using a social networking platform. Thereafter, at step 404, system 100 generates an identifier using the information received by the user. The generated identifier is compared with the existing identifiers at step 406. It shall be noted that, there can be various scenarios, wherein an identifier for the user has already been created. For example, the instant user's online social networking friend might have created an account using the social networking platform. During creation of the account, system 100 might have accessed information corresponding to the instant user, and created an identifier for the instant user. In another example, the instant user might have created an account in a first website, which is coupled to the system 100, using a first social networking platform. Thereafter, the instant user might be in the process of creating an account in a second website, which is coupled to the system 100, using a second social networking platform. In this scenario as well, the system might have created an identifier for the instant user when he created an account in the first website. Hence, by comparing the newly generated identifier with the existing identifier, the system 100 can identify unique users, and also aggregate information gathered from multiple social networking platforms to increase the relevancy of the targeted content presented to the user.

It shall be noted that, there can be various scenarios, wherein the newly generated identifier and the existing identifiers do not match completely. At step 410, the system checks whether there is a partial match between the newly generated identifier and the existing identifiers. If there is a partial match, then at step 412, the system 100 checks if the partial match is satisfactory to conclude that an identifier for the instant user already exists. If the partial match is satisfactory, then the system correlates existing information corresponding to the instant user with the newly discovered information to present targeted content to the instant user. However, if the match is not satisfactory, then the system may conclude that a new unique user has been identified.

In an embodiment, system 100 may be coupled to an ecommerce website that enables purchasing of entities over the internet. The user accesses the ecommerce website using a web browser provided in the user terminal 110. In an embodiment, the user is asked to authenticate himself. The user may authenticate himself by communicating his authentication credentials, such as, user identification and password to the authentication module 102. Alternatively, the user may authenticate himself using his authentication credentials for a online social networking platform, such as Facebook. To authenticate himself using the website online social networking platform, the user can click on the sign-in button of the social networking platform and provide the required authentication credentials in the sign-in web page of the social networking platform. The sign-in button of the social networking platform can be provided in the ecommerce website. In an embodiment, the authentication module 102 can be configured to seek additionally permission from the user. For example, when the user successfully authenticates himself by using the social networking platform, the user is requested to grant explicit permission to extract information corresponding to him. Further, permission may be sought to extract information corresponding to the user's friends. Furthermore, permission may be sought to carry out certain actions in the social networking platform, on behalf of the user.

If the user grants permission to the extract the requested information, then the data aggregation module 104 extract the information. The data aggregation module 104 may be configured to extract data to which the permission has been granted by the user.

In an embodiment, the data aggregation module 104 may extract, from the social networking platform, data corresponding to, user identification, date of birth, location of the user, email address, likes and dislikes. Additionally, the data aggregation module 104 may extract data corresponding to friends, such as, friends' name, date of birth, location, likes and dislikes.

In an embodiment, information to be stored in the database 106 may appear as:

```
[user]
  [[userid]: 1234
[username]: Jagdish Nomula
  [dob]: 01/01/1976
  [location]: San Jose
  [friends]
    [friend ]
      [[friendid]: 1324
      [username]: Todd Johnson
      [dob]:01/02/1974
      [location]: San Francisco
      [hobbies]: Hiking, Tennis
      [likes]: Britney Spears, Barak Obama
```

[feed]: The next time Steve pulls out a new iPhone, you can be sure where everyone's eyes will be . . .

```
]
  ....
]]
```

For the above example, in an embodiment, a hash function may be used, which maps username, date of birth and location to a Byte Array. A person skilled in art would know that this functionality could be replaced with other implementations. This function could be a one-way hash function, to ensure that privacy of users is not compromised.

The identifier generation module 107 may be configured to generate an identifier for the user. The identifier may be generated using name of the user, date of birth and location of the user, which are extracted from the social networking platform.

In an embodiment, the identifier may be generated using the name of the user and the user's date of birth.

In another embodiment, the identifier may be generated using the user ID and the user's date of birth.

In yet another embodiment, the identifier may be generated using the user ID, user's date of birth, email address and location of the user.

The identifier generated and the extracted data is sent to the database 106. The database 106 is configured to store the identifier and the corresponding data. The database 106 is configured to be queried, at least by the targeted content selection module 108. The database 106 may be configured to enable retrieval of data from the database 106 by the targeted content selection 108 for further processing to generate recommendations of entities, which will be presented to the user. It shall be noted that the information used for processing is mapped to the context in which targeted content is being presented to the user.

Figure 5:
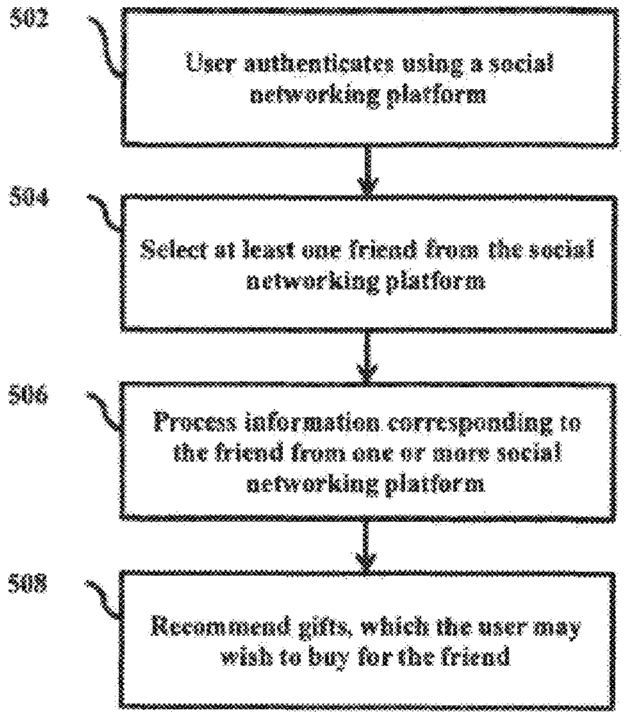
FIG. 5 is a flow chart illustrating a method for recommending gifts, which a user may wish to purchase for his friends, in accordance with an embodiment.

In an embodiment, system 100 may be configured to recommend gifts to users, which the users may buy for his friend(s). FIG. 5 is a flow chart illustrating a method for recommending gifts, which a user may wish to purchase for his friends in accordance with an embodiment. An ecommerce website may allow a user to purchase gifts for his friends. Such a website may be configured to present recommendations corresponding to the gifts the user's friend or friends may like. In order to purchase gifts, the user accesses the website using a web browser. The website may allow the user to purchase gifts or present recommendations after the user successfully authenticates himself. At step 502, the user authenticates himself using a social networking platform. A link to the authentication page of the social networking platform may be provided in the ecommerce website. After successful authentication, the user selects one or more friends who are in his friend network in the online social networking platform, for whom the user wishes to purchase gifts. To make understanding convenient, we may assume that the user selects one friend from the social networking platform. The system 100 extracts information corresponding to the friend, and processes the information at step 506. Thereafter, based on the processing, system 100 presents recommendations corresponding to the gifts the user's friend may like. In one embodiment of extracting application related information, a naive Bayes classifier is used to classify a person as a sports fanatic or tech savvy person and recommend him sports accessories or tech gadgets. In another embodiment, collaborative filtering algorithm is used to recommend gifts to used based on gifting/personality related keywords in social feed.

In an embodiment, after the user selects a friend to whom he wishes to purchase gift(s), the system may generate an identifier for the friend. Thereafter, the system 100 may verify if the generated identifier matches (completely or partially as described earlier) with existing identifiers. If the generated identifier does not match with the existing identifier, the system 100 may conclude that a new user has been identified. The system 100 extracts information corresponding to the friend from the social networking platform. The information is processed by system 100 to present recommendations corresponding to the gifts the user's friend may like.

Alternatively, if the generated identifier for the friend matches with an existing identifier, then the system may use information corresponding to the friend, which may already exist in system 100, and may extract any new information corresponding to the friend from the social networking platform, to process and present recommendations. It shall be noted that information, corresponding to the friend, which may have been extracted from other social networking platforms, may exist in the system. In this scenario, system 100 will be able to provide recommendation based on information, corresponding to the friend, which has been aggregated from more than one online social networking platform.

As an example, the system 100 may be configured with two websites, one that sells goods and services, and other that facilitates purchasing gifts for friends. If the friend (from the above embodiments) has used to first website to purchase an iPhone, the system may have generated an identifier for the friend and aggregated information about the friend, including the activity of purchasing of the iPhone. Thereafter, when the user (from the above embodiments) signs-in to the second website to purchase gifts for his friend, the system 100 may generate an identifier for the friend. Thereafter, the system 100 realizes that an identifier has already been created for the friend. Subsequently, system 100 uses information corresponding to the friend, such as, purchase of the iPhone, to provide recommendation. For example, the gift recommendations may include accessories for iPhone, such as, iPhone cases, car charger and iPhone screen protector, which the user's friend may like, thereby, increasing the relevancy of the recommendations presented.

In another example of recommending gifts, system 100 may have access to information corresponding to the user's friend from more than one social networking platform, such as Foursquare, which may provide information corresponding to the friend's location, and another social networking platform, such as Facebook, which may provide information, such as likes, dislikes and interests, corresponding to the friend's. The system can use the information, aggregated from both the social networking platforms, corresponding to the friend, to provide gift recommendations to the user. For example, the system may identifies that the user's friend is in London from one of the social networking platforms, and may also identify that the friend likes wine tasting, from the second social networking platform. In light of these identifications, the system may include wine tasting sessions and offers among the recommendation of gifts provided to the user, who may purchase the gift for his friend, thereby enhancing the relevancy of the recommendations presented.

In an embodiment, user friend's information (feed information) is combined with recommendation algorithms, such as, collaborative algorithm, which can be used in the friend feed as additional attributes in estimating the relevance of results that are shown to the user.

In one of the embodiments, a friend feed is analyzed for keywords in an application context, which is used to refine the neighbor-hood scores given by collaborative filtering/information retrieval algorithms. The important keywords themselves can be extracted from a data store combined with category information in the feed from the friend. For example, if the feed includes "Music: Britney Spears concert is great", then a music recommendation application would add Britney Spears as one of the liked artists in Music Entities Category, by doing a data-store lookup for important string matches in the feed, combined with sentiment analysis. In an embodiment, important strings in the feed are extracted using token weights, TFIDF (term frequency inverted document frequency) scores across social feed by eliminating stop words approach in one embodiment. The sentiment analysis can be done by a Bayes classifier in one embodiment. In another embodiment, a SVM (support vector machines) classifier is used to get sentiment information about a given entity. It is to be noted that a person skilled in the art can come up with different ways of analyzing feed. One embodiment for instance can just use look up in the data store for the whole, skip the token weights and use a decision tree for sentiment analysis.

A person skilled in art would know that social feeds that are derived in an application can be used across other applications as we are storing the feeds and users info in a data store.

Further, the embodiments disclose techniques used to solve problems in advertising with the help of virtual agent servers 600. A virtual agent server 600 can share advertisements with a user and can clarify the user's doubts about the advertisement. The virtual agent server 600 can converse with the user until all their doubts are cleared, and can place orders on behalf of the user. Further, the virtual agent server 600 can decide what type of advertisement to share with the user by considering the activities of the user. A common identifier can be used to aggregate and analyze the activities of the user.

In an implementation, a virtual agent server 600 may communicate advertisements to a user, receive inputs from the user and reply to the user. The virtual agent server 600 may try to clarify doubts of the user or complete a task for the user.

Figure 6:
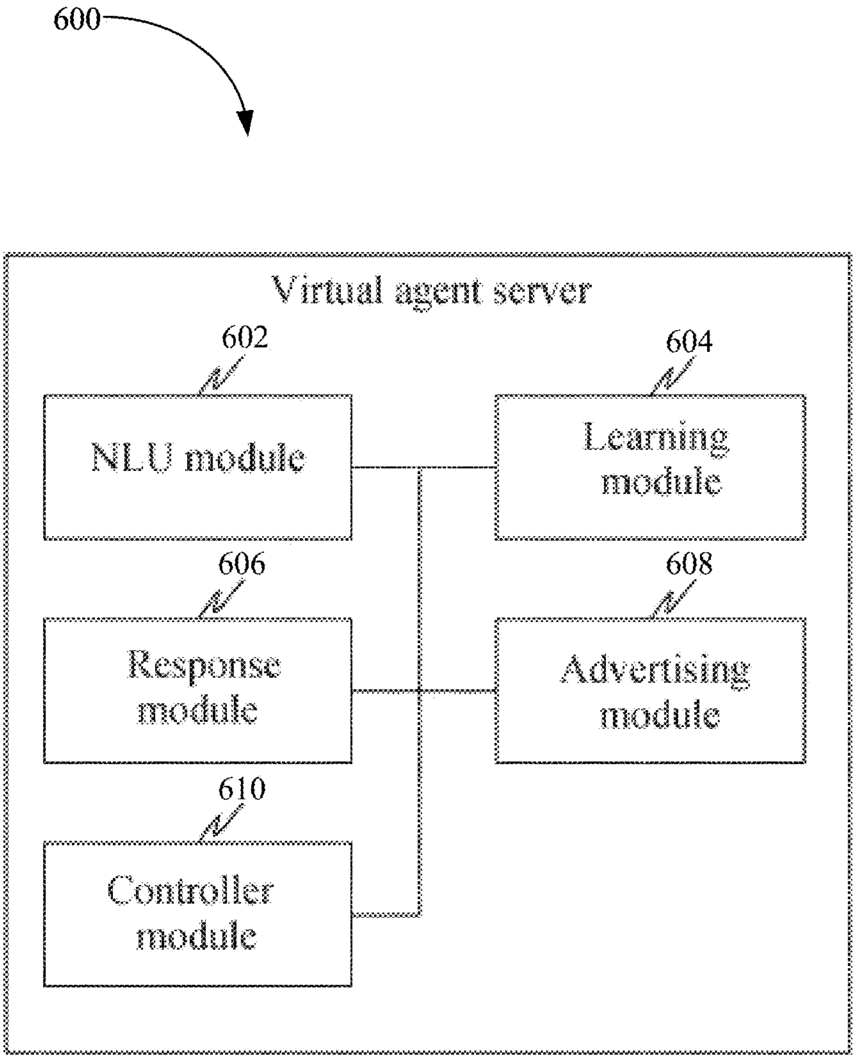
FIG. 6 depicts an exemplary architecture of a virtual agent server, in accordance with an embodiment.

FIG. 6 depicts an exemplary architecture of a virtual agent server 600, in accordance with an embodiment. The virtual agent server 600 may include a Natural Language Understanding (NLU) module 602 to understand the speech of the user, a learning module 604, a response module 606 to determine responses for the user, an advertisement module 608 and a controller module 610.

In an implementation, the Natural Language Understanding Module 602 (hereafter called NLU module 602) may be used by the virtual agent server 600 to understand the natural speech of the user. In an implementation, the NLU module 602 may receive the user's natural speech as an input. This natural speech may be in the form of audio information or text in a natural language format. Further, the NLU module 602 may parse information from the received natural language speech to determine one or more pieces of information corresponding to the user from the speech of the user. The determined user information may include one or more of the user's desired action and context of the desired action, among others.

In an implementation, one or more inputs may be derived from one or more previous or current communication sessions between two or more among a first user (customer), a second user (customer service representative) and a virtual agent server 600.

In an implementation, the NLU module 602 may use machine learning classification and natural language processing techniques to determine the intent of the conversation. The NLU module 602 may also query a graph which may model conversations on an inverted index to figure out the search intent (as discussed below).

In an implementation, the NLU module 602 may determine the user's intent and use slot filling algorithms to determine different objects in the sentence. The slots associated with the application may be learnt by pattern matching or using neural network technique by feeding slot outputs and conversation inputs from previous interactions.

In an implementation, the learning module 604 may be used by the virtual agent server 600 to receive one or more sets of data to train on. Further, the learning module 604 may use the received training data to learn and store different types of speech or text responses for different situations faced by the virtual agent server 600 while communicating with the user.

In an implementation, the learning module 604 may be configured to receive and process one or more recordings of conversations between a customer service representative and a user. Further, the learning module 604 may convert the conversation between the user and customer service representative from natural speech format to device-readable format. The learning module 604 may use one or more speech-to-text recognition techniques to analyze the conversation for learning and store them in a database for future use. The stored conversations may be used to improve the intelligence of the virtual agent server 600 on a continuous basis by storing the conversations in a graph data structure on an inverted index for efficient retrieval in future conversations.

In an implementation, the learning module 604 may identify and store one or more conversation dialogues as parent nodes. These parent nodes may comprise dialogues spoken by the user that require a response from the virtual agent server 600. Further, the learning module 604 may identify and store one or more dialogues as child nodes which are used as responses corresponding to the one or more identified and stored parent nodes. Elaborating further, in an implementation, a dialogue may be defined by the learning module 604 as the smallest element in a conversation between a user and a virtual agent server 600 or a business organization. A dialogue may be represented by two nodes with an edge between them.

In an implementation, a graph may be constructed manually by an interaction designer, which may then be inserted on inverted index. In yet another implementation, in case a great amount of training data is available to the virtual agent server 600, a recurrent neural network may be trained on the interaction between the customer and the customer service representative by using the training data.

In an implementation, the learning module 604 may be configured to store conversational dialogues in multiple alternative formats, depending on the data available and the desired retrieval approach. In one example, the dialogues may be modeled as questions and answers on a neural network using sequence-to-sequence (seq2seq) algorithms, wherein a user utterance is treated as an input sequence and a corresponding system response is treated as an output sequence. In such an embodiment, the seq2seq model may be trained on historical or real-time interaction data, enabling the virtual agent server 600 to generate answers that are contextually relevant even when the user's phrasing does not exactly match stored utterances. In another example, the dialogues may be represented as parent nodes and corresponding responses as child nodes of a graph formed on an inverted index. In such a graph-based structure, each parent node may correspond to a user dialogue or query, and each child node may correspond to a system response, with edges representing the conversational flow between them. In yet another example, the dialogues may be modeled simultaneously in both formats i.e., stored as questions and answers in the seq2seq framework and as parent-child pairs in the graph structure, such that the system can flexibly choose between retrieval-based graph navigation and generative neural network response generation depending on runtime context, resource availability, or confidence score thresholds.

In an implementation, the learning module 604 may further be configured to import historic customer-service recordings, such as recorded telephone conversations, online chat transcripts, or messaging interactions between a user and a customer service representative. These recordings may be processed to convert natural speech into device-readable text using speech-to-text recognition techniques, and thereafter analyzed to extract utterance-response pairs. Once extracted, the utterances and responses may be mapped into one of two storage formats. In one embodiment, the utterance-response pairs may be transformed into questions and answers that are suitable for training sequence-to-sequence algorithms. For instance, a customer utterance such as "What is your return policy?" may be modeled as an input sequence, and a representative response such as "You may return the product within 30 days with proof of purchase"

may be modeled as the output sequence, thereby expanding the training corpus for the neural network. In another embodiment, the utterance-response pairs derived from historic recordings may be added to the existing conversation graph as additional parent and child nodes. For example, the customer's utterance may be represented as a parent node, while the agent's reply may be stored as a child node linked to that parent node, thereby enlarging the graph and improving retrieval coverage for future queries. By accommodating both the seq2seq framework and the graph-based framework, the learning module 604 enables the system to continuously learn from real customer-service data and evolve its conversational intelligence in both generative and retrieval-oriented dimensions.

In an implementation, the response module 606 may be used by the virtual agent server 600 to generate one or more different responses to be shared with the user in different scenarios. A user may initiate a response to an advertisement which in turn may require a response from the virtual agent server 600 to the user.

In an implementation, the response module 606 may receive inputs from the NLU module 602 comprising the user's conversation and the context of the user's conversation. Further, the response module 606 may identify one or more recent dialogues in the current conversation that require a response from the virtual agent server 600 to the user. The response module 606 may retrieve one or more parent nodes to identify a parent node which is most suitable to the recent dialogue in the current conversation between the user and the virtual agent server 600. Subsequently, the response module 606 may retrieve one or more child nodes corresponding to the identified parent node. Further, the identified child nodes may be communicated to the user during the conversation.

In an implementation, the response module 606 may build a bipartite graph with a hierarchy of dialogues to converse with the user. The dialogues may be connected and branched away in case one or more new combinations arise during conversations across different communication platforms. The graph may be built on an inverted index data structure to support efficient text search.

In an implementation, as an example, an initiation sentence from the virtual agent server 600 such as "Hello, {Customer Name}! This is {Company}. How can I help you?" may be represented as the root node of a graph. The data in the node may comprise one or more placeholders for one or more of the user's name, and the business name, among others. The placeholders in the conversation for building the graph may be identified by looking for fuzzy string matches from the input dictionary comprising one or more inputs such as the business name, the customer name and the items served by the business, among others.

In yet another implementation, one or more Name Entity recognition techniques may be used to identify the labels in the input.

In an implementation, a node may be annotated with information regarding whether the user or the virtual agent server 600 was the speaker of the dialogue corresponding to that node. The node may also comprise one or more features such as semantic mappings of the sentence and vector computed using sentence2vec algorithm by training a Recurrent neural network on the domain that the software agent is trained for.

In an implementation, a different semantic response from the user may be used to create a child node for the parent node corresponding to the dialogue shared by the virtual agent server 600. The semantic equivalence to the existing nodes on the graph is achieved. In an implementation, the semantic equivalence of two nodes may be calculated by computing cosine similarity between the top results from one or more learn-to-rank algorithms, including, for example, Lambda Mart, borrowed from one or more search techniques after doing a first pass inexpensive ranking on the inverted index of the graph of conversation.

In an implementation, the result from a learn-to-rank algorithm with the highest score exceeding a certain threshold may be used as a representative for the user input. The semantic equivalence comparison and scoring may be done after tokenizing, stemming, normalizing and parametrizing (recognizing placeholders) the input query. Further, one or more slot filling algorithms may be used to parametrize the user responses. The slot filling algorithms may use HMM/CRF models to identify one or more part of speech tags associated with keywords and statistical methods to identify one or more relationships between words. In case there is a match to an existing dialogue from the user, the response module 606 may store the dialogue context of the existing dialogue instead of creating a new node. In case there is no match, a new node may be added to the node of the last conversation.

In an implementation, some dialogues may be questions with straightforward answers. As an example, consider a user asking a question to a virtual agent server 600 representing a restaurant:

User: "What is your specialty?"

Virtual agent server 600: "Our specialty is Spicy Chicken Pad Kee Mow".

In another implementation, a user may converse with a virtual agent server representing a shopping website:

User: "Is anything on sale?"

Virtual agent server 600: "Yes, there is a sale of 20% off on all electronic gadgets."

These dialogues may be indexed on the graph as orphan parent-child relationships in the graph.

In an implementation, a change in context may be a common challenge while building a graph that may constantly learn. In case there is no change in the context, a node may be created as a child of the previous node. In case there is a change in the context, a new node may be needed which is different from the previous state in the graph. In an implementation, one or more classifiers such as a Bayesian or SVM Machine Learning classifier may be used to determine a change in context when the user talks to the customer service representative. The classifier may be trained on crowd sourced training data using one or more features. These features may include one or more of: number of tokens common to a current and previous task; and matching score percentage between the user's speech and the maximum score match of an existing dialogue. A different classifier may be trained for different domains to improve the accuracy of the classifier.

In an implementation, Neural Networks may be used by the virtual agent server 600 to implement personalisation in the conversation with the user. The virtual agent server 600 may be provided with training data comprising one or more stored conversations between two humans. Subsequently, one or more cluster algorithms identified online may be used to train one or more models with the training data received by the virtual agent server 600. Subsequently, one or more user features may be included in the model to accomplish personalization while conversing with the user.

In an implementation, one or more user profiles may be clustered into one or more macro groups to implement personalization to models in a recurrent neural network. An unsupervised clustering algorithm such as K-Means clustering may be used to accomplish this. Alternatively, manually curated clusters may be created based on one or more information about the user such as age group, location and gender of the user, among others. Further, the weight of the examples that had a positive conversion from the virtual agent server 600 may be boosted. In an implementation, this may be achieved by duplicating positive inputs in the training data. The positive inputs may be characterized by one or more pieces of information including the order price and satisfaction from the user, among others. Additionally, one or more user features such as age and gender can be added as an additional input for the Machine Learning models.

In an implementation, the idea of personalization in neural networks may not be specific to conversational customer interactions and may be used in one or more situations including building models which send automatic responses to emails. In an implementation, the graph on the inverted index may be used by a virtual agent server 600 to answer questions about the business. The virtual agent server 600 may start from the root node of the graph to greet the user during a conversation on one or more of a call, SMS or messenger. The user may respond to the greeting with a question about the business. Subsequently, the response module 606 may search for the closest match to the user's question by using techniques borrowed from information retrieval. In an implementation, this may be accomplished using an inverted index to look up possible matches for the user input using an in-expensive algorithm initially and then evaluating the matches with an expensive algorithm such as a Gradient Boosted Decision Tree. The response module 606 may run one or more stemming, tokenization and normalization algorithm on the input query to make sure that the input may be searched properly by the algorithms looking for match before hitting the inverted index.

In an implementation, the advertisement module 608 may be used by the virtual agent server 600 to identify one or more advertisements that the user may be interested in. Further, the advertisement module 608 may be used to communicate the identified advertisements with the user.

In an implementation, the advertisement module 608 may analyze user actions online and offline by collecting their search and browse actions on one or more websites such as FACEBOOK and GOOGLE, among other websites and web applications. Further, the advertisement module 608 may receive offline records from credit transactions.

In an implementation, an identifier for the user may include an email-id, username or a common identifier. This identifier may be used to aggregate information corresponding to one or more actions made by the user. The advertisement module 608 may use one or more big data technologies such as HADOOP, Map-reduce paradigm and one or more real time offline processing frameworks such as Apache KAFKA or Spark to aggregate information. For example, in an implementation, information corresponding to one or user actions may be transferred using Apache KAFKA, stored on HADOOP file system and Map-reduce paradigm may be used to aggregate the data points for a user.

In an implementation, search queries and websites used by the user may be analyzed to derive items the user is interested in. Additionally, advertisements may be customized before communicating the advertisement to the user. One or more placeholders present in the advertisement may be customized to include the user's information at run-time.

In an implementation, the aggregated actions of the user may be used to identify which stage the user is currently in, compared to the advertiser's objectives. For example, in case the user is browsing web pages of camera review sites by entering broad queries such as "best camera" or "camera reviews", the virtual agent server 600 may determine that he is in the discovery stage.

In an implementation, the aggregated actions of the user may be obtained from one or more current or previous communication sessions involving the user, wherein the communication session was tracked.

In an implementation, the aggregated actions of the user may be obtained from one or more external sources, wherein the external source comprises one or more web applications used by the user or one or more databases comprising information about the user.

In an implementation, the virtual agent server 600 may provide a service to the user to help with completion of transaction after the user has viewed an advertisement and wishes to place an order. The virtual agent server 600 may share one or more advertisements with the user to monetize the transaction service. One or more advertisers may bid on keywords and user profiles similar to online advertisement platforms including Facebook and google ads.

In an implementation, the advertiser's messages for a natural language conversation may be crafted using manual curation. Taking an example of a retailer, the advertiser may use three stages of a purchase funnel. In the first stage, an interaction designer may model the conversation as a "discovery stage" where multiple choices corresponding to a particular type of product may be shown. In the second stage, individual products that the user may be interested in and information about the individual product may be shared with the user. In the third stage, a call for action can be shared with from the user. This call for action may comprise of an offer corresponding to the product which was communicated to the user in the second stage.

In an implementation, a Support Vector Machine learning classifier may be used to determine the conversation intent and stage in the purchase channel after training it with one or more features such as search keywords, domains and categories of the web pages visited by the user. Further, the conversational marketing may be modelled as a graph on an inverted index as discussed above. Additionally, the virtual agent server 600 may use one or more learn-to-rank algorithms such as Gradient Boosted Decision Tree to identify a match for the user context. Making customer interactions conversational by modelling it as a graph on an inverted index hosted on a machine may make the system work efficiently for millions of businesses.

An example of the three advertisement stages may be as follows:

In the first stage, the user may be searching for a broad type of product. The first stage advertisement may include multiple products with a message "Here are some {items}", where {items} are the product names derived from the actions of the user. In case the user shows interest in the first stage advertisement, a second stage advertisement showing individual product(s) may be shared with the user, along with a message "See this {specific item} on Amazon". In case the user shows further interest in the second stage advertisement, a third stage advertisement may be shared with the user which includes offers for the individual products shared in the second stage advertisement. Further, a message may be shared with the user stating: "Two days free shipping on {specific item} for the next 5 hours".

Additionally, an advertising message may then be generated for the user shopping intent which includes one or more appropriate text, image, audio clip, video clip or hyperlink.

The advertisement may be shared with the user when they visit a website or watch a video using one or more of an ad network, ad exchange or directly integrated-into-ad platform such as FACEBOOK and GOOGLE which have high traffic.

In an implementation, the advertisement module 108 may be further configured to determine a purchase-funnel stage for a given identifier using a classifier trained on features including search keywords, domains, and page categories derived from the user's online and offline activity. The classifier may include, but is not limited to, a support vector machine (SVM), a logistic regression model, or a neural network model trained on labeled data representing different stages of a purchase journey. Once the funnel stage is determined, the advertisement module 608 may select an advertisement from a pool of candidate advertisements, wherein the selection is ranked based on at least one of: expected revenue to the advertiser, user preference inferred from historic actions or social tokens, and current context determined from the ongoing conversation. After selection, the advertisement module 108 may generate a multi-stage advertisement message set, corresponding to at least three progressive stages-discovery, consideration, and action. For instance, in the discovery stage, the advertisement may present broad product categories; in the consideration stage, the advertisement may highlight specific product details or comparisons; and in the action stage, the advertisement may deliver a personalized offer or call-to-action. By progressively refining the advertisement messaging according to the funnel stage, the advertisement module 108 ensures that user engagement is guided naturally from initial awareness to a potential transaction.

In an implementation, the advertisement module 608 may also be configured to insert one or more friend-derived tokens into placeholders of an advertisement message to enhance personalization. The friend-derived tokens may be extracted, subject to user permission, from a social-network interface and may include attributes such as an employer of a friend, an upcoming birthday of a friend, or group affiliations of a friend. By inserting these tokens into a consideration-stage or action-stage advertisement message, the system may contextualize the advertisement in relation to the user's social circle, thereby improving relevance and likelihood of engagement. For example, in a consideration-stage message relating to concert tickets, the advertisement module 108 may populate a placeholder with the information that "Your friend Alex from Google is also attending this event," or in an action-stage promotion, the system may include "Special birthday offer available for your friend Sam's upcoming celebration." Such friend-derived personalization may create stronger resonance with the user, leading to increased conversion rates compared to generic advertisements.

In an implementation, the controller module 610 may coordinate between other modules of the virtual agent server 600 to assist users in a customer service. Further, the controller module 610 may comprise instructions regarding the actions to be taken by the virtual agent server 600.

In an implementation, the controller module 610 may need to communicate with one or more different application programming interfaces to gain knowledge regarding external systems. As an example, the virtual agent server 600 may communicate with one external application to get customer information and with another external application to get customer service cases. The current application programming interface based communication has become complex to automate as it requires a developer of the software to create mapping between the user context and external application programming interfaces. Further, an application programming interface may be automated by using semantic understanding of the capabilities of the systems. This may be accomplished by creating a global registry of application programming interfaces, with annotations assigned to the parameters with synonyms of the keys which may make it easier for the consuming services to map the runtime context to the parameters. Alternatively, a universal language and a sequence of exchanges for associating input context to an external application programming interface may be created.

In an implementation, the controller module 610 may be further configured to insert the advertisement into the dialogue flow as either a question presented to a sequence-to-sequence algorithm or as a node inserted into the graph structure maintained on the inverted index. When inserted into the sequence-to-sequence framework, the advertisement may be treated as a query or prompt such that the system can generate an appropriate response or follow-up message using the trained neural network. When inserted into the graph framework, the advertisement may be represented as a child node linked to a relevant parent dialogue node, thereby enabling retrieval and contextual continuity in future conversations. The controller module 610 may additionally be configured to monitor user responses to these advertisement insertions and to advance the advertisement to a next stage of the purchase funnel only when the user's response satisfies stage-specific criteria. For example, in the discovery stage, a simple click or affirmative response may suffice to move the user into the consideration stage, whereas in the consideration stage, a deeper engagement such as a request for specifications or price comparison may be required to trigger advancement to the action stage. By enforcing stage-specific criteria, the controller module 610 ensures that advertisement progression follows a natural conversational flow and prevents premature or irrelevant promotion of offers.

In an implementation, the virtual agent server 600 may be able to communicate one or more relevant advertisements to the user when the user is waiting on the completion of a task. In this case, the controller module 610 may determine whether to communicate an advertisement to the user. This may be done by starting another asynchronous thread/process to initiate the execution of the suggestion on behalf of the user. The virtual agent may use the current thread to deliver an advertisement. Simultaneously, the controller module 610 may communicate a message to the user regarding the execution of the suggestion.

As an example, the virtual agent server 600 may communicate the following message to the user: "I am confirming your order with the customer service of the restaurant OLIVE GARDEN. For your next special order, please consider "CALIFORNIA PIZZA KITCHEN". They have introduced a new dish called Vegetarian Lasagne which you might like". This communication may be an audio, video or a text advertisement.

As another example, in a retail store context, the customer may place an order. Further, the virtual agent server 600 may communicate the following message to the user: "I am confirming your order with Amazon. For your next purchase, please consider "Buyer's Best Electronics goods.". They are offering a discount on BLUETOOTH speakers which you may like".

In an implementation, the advertisement module 608 displays the advertiser's advertisement as follows: the advertisement module 608 may search through the advertiser database and load information corresponding to ads. Further, the advertisement module 608 may assign rank to the advertisements related to one or more of: revenue, preferences of the users, relevance to the user's desired action and to the context of the desired action. Subsequently, the advertisement module 608 may then communicate the advertisement to the user. In an embodiment, a learn to rank algorithm may be used to rank the search results.

Figure 7:
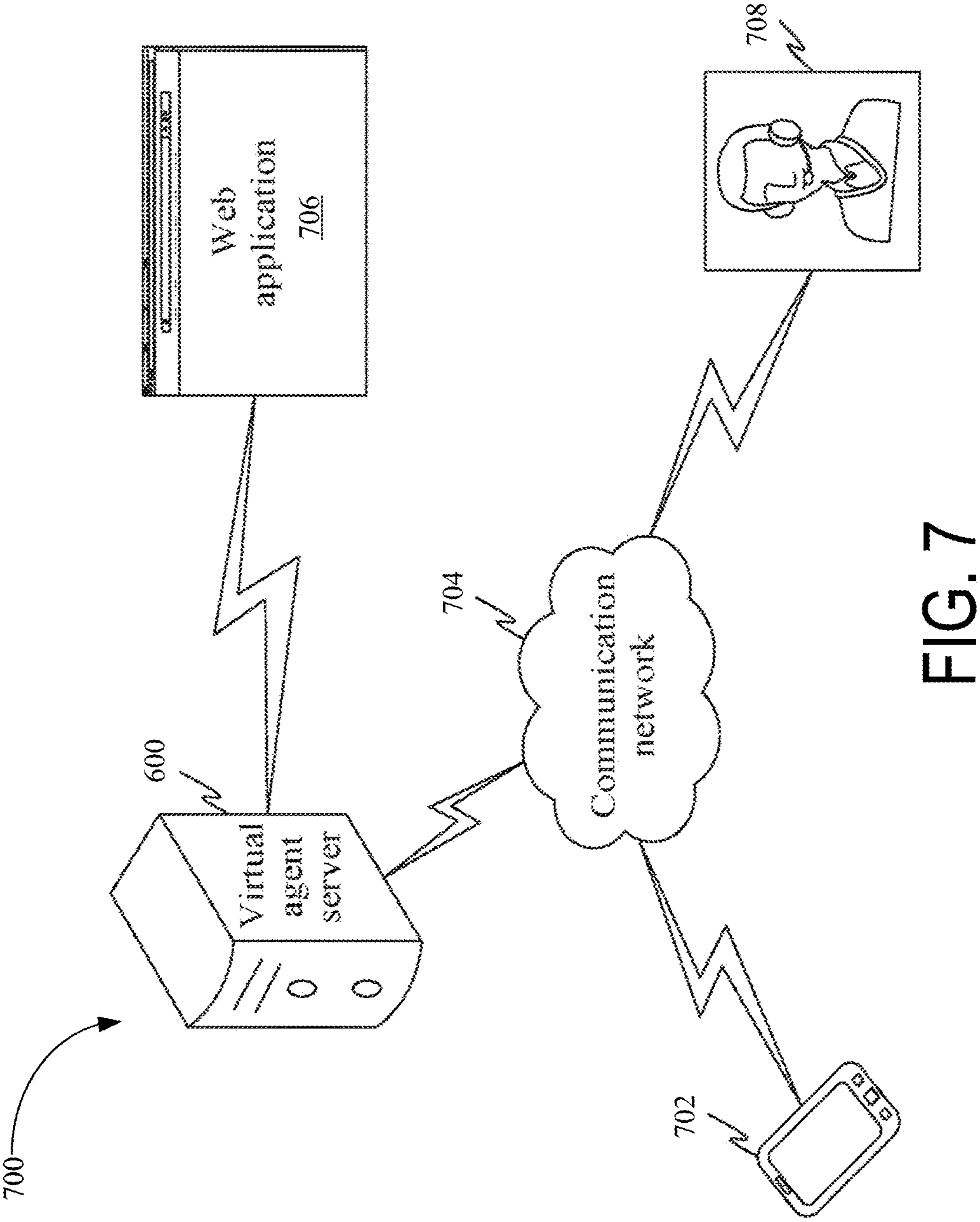
FIG. 7 depicts a system including the virtual agent server for assisting in conversational marketing, in accordance with an embodiment.

In an implementation, FIG. 7 depicts a system 700 comprising a virtual agent server 600 which may represent a web application 706 of a business. The virtual agent server 600 may communicate with a user through their user's mobile device 702 and using a short message service channel 704, a phone call channel or a social network 708.

In an implementation, the system 700 may track a conversation between the user and a web application 706. Further, the virtual agent server 600 may communicate an advertisement directed at the user as part of the conversation between the user and the web application 706. The virtual agent server 600 may receive one or more responses from the user and identify the response is for the advertisement. Further, the virtual agent server 600 may carry out at least one action if the user responded to the advertisement.

In an implementation, the user's mobile device 702 may include mobile phones, palmtops, PDAs, tablet PCs, notebook PCs, laptops and computers, among other computing devices. In an embodiment, the user's mobile device 702 may include any electronic device equipped with a browser to communicate with the virtual agent server 600. The user's mobile device 702 may belong to a user who may use it to communicate with the virtual agent server 600. In an implementation, the user's mobile device 702 communicate with the virtual agent server 600 and share inputs related to the user with the virtual agent server 600.

In an implementation, the virtual agent server 600 may be implemented in the form of one or more processors with a memory coupled to the one or more processors with one or more communication interfaces. The virtual agent server 600 may communicate with one or more external sources and one or more users' mobile devices 702 through a short message service channel. It may be noted that some of the functionality of the virtual agent server 600 may be implemented in the user's mobile device 702.

The system 700 may enable a computing system to converse with a human, wherein the system comprises a plurality of nodes. In an implementation, a first set of nodes may represent statements that may be made by a human, and a second set of nodes may represent statements that may be made by the computing system. The first set of nodes and the second set of nodes may be interconnected such that the interconnection enables the system 700 to select at least one of the statements represented by the second set of nodes, based on a statement from the human, which is mapped to one of the statements represented by first set of nodes.

In an implementation, at least one of the first set of nodes may be directly connected to a plurality of second set of nodes.

In an implementation, the system may be configured to select one or more among the second set of nodes, as a response to a statement represented by one of the first set of nodes to which the second set of nodes is directly connected. The second set of nodes may be selected based on a path navigated to reach the first set of nodes to which the second set of nodes is directly connected.

In an implementation, the system may be configured to enable a customer service representative to converse with the human in case a statement made by the human is not mapped to any of the first set of nodes.

In an implementation, the system may be configured to enable a customer representative to converse with the human in case a statement made by the human is mapped to one of the first set of nodes, which is not connected to any of the second set of nodes at a lower hierarchy.

In an implementation, the system may be configured to generate the first set of nodes and the second set of nodes by processing one or more learning data. In an implementation, the learning data may comprise conversation data between a first category of humans and a second category of humans. Further, the system 700 may be configured to build the interconnection by processing the learning data.

Figure 8:
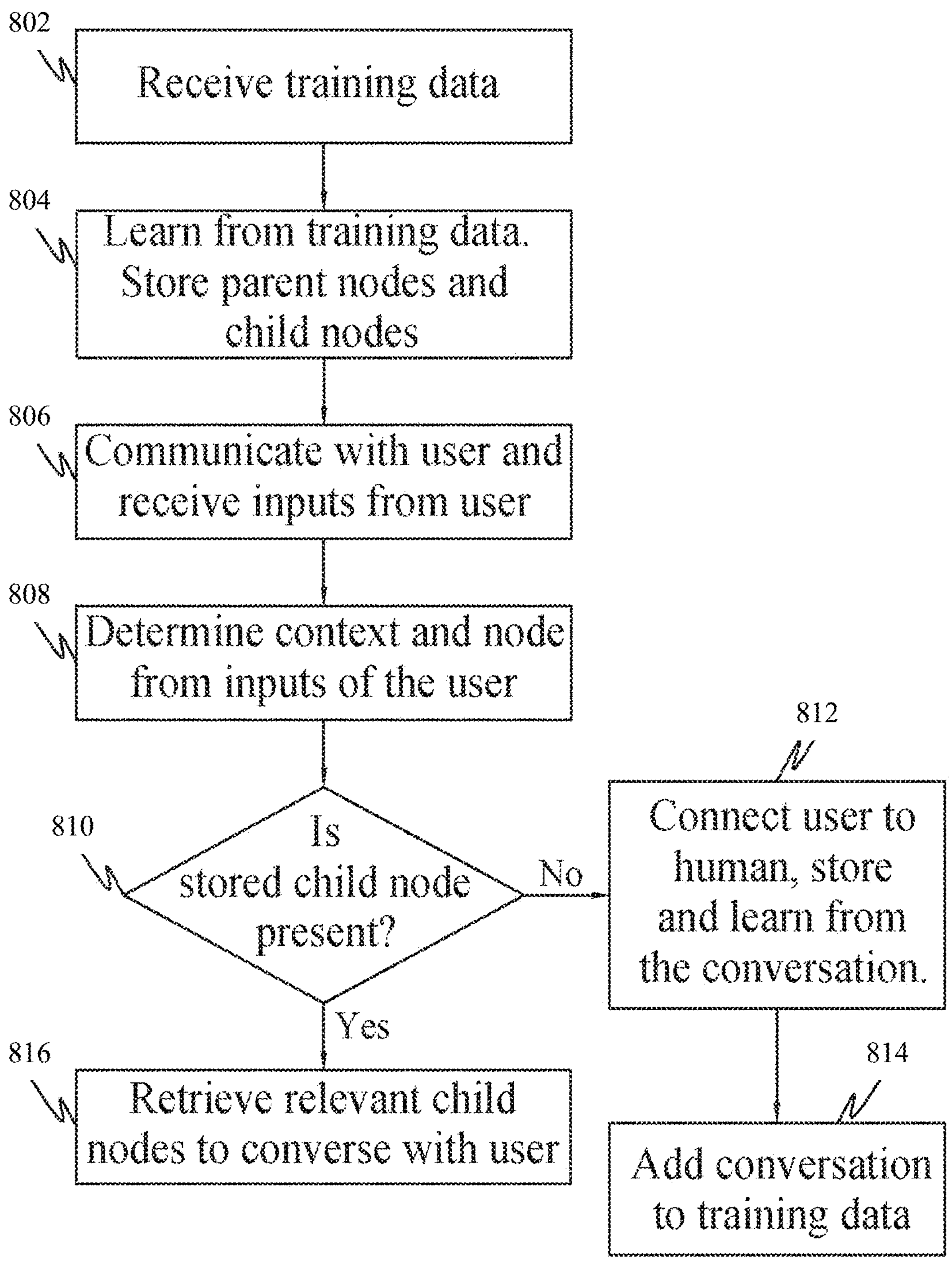
FIG. 8 depicts a flowchart of an exemplary method for interactive advertisement with a user, in accordance with an embodiment.

In an implementation, FIG. 8 depicts a flowchart of an exemplary method 800 for interactive advertisement with a user, in accordance with an embodiment. In an implementation, the virtual agent server 600 may receive one or more sets of training data as shown at step 802. The training data may be processed as discussed above. Subsequently, the virtual agent server 600 may learn how to build a conversation by using the training data. Further, one or more parent nodes and their corresponding child nodes may be stored in a database as shown at step 804. The parent node may represent a dialogue and the child node may represent the response dialogue corresponding to the dialogue stored in the parent node.

In an implementation, the virtual agent server 600 may communicate one or more advertisements to the user. In case the user shows an interest, they may respond to the advertisement. The inputs may be received by the virtual agent server 600 as shown at step 806. Further, the virtual agent server 600 may understand the speech of the user by converting it into text and determining a context of the conversation with the user. Further, the virtual agent server 600 may try to determine one or more dialogues that may be similar to the stored parent nodes as shown at step 808. Subsequently, the virtual agent server 600 may retrieve one or more child nodes corresponding to the determined parent node as shown at step 810. In case the virtual agent server 600 has determined that there were no stored child nodes, building further conversation with the user may not be possible. Hence, at step 812, the virtual agent server 600 may connect the user to a human being. This human may be a company representative or a customer service representative, among others. The conversation between the user and the human may be processed by the virtual agent server 600 for processing and learning. Further, the conversation may be added to the training data as shown at step 814.

In case the virtual agent server 600 has determined the presence of a stored child node, it may be retrieved and the dialogue corresponding to that node may be communicated from the virtual agent server 600 to the user.

Figure 9:
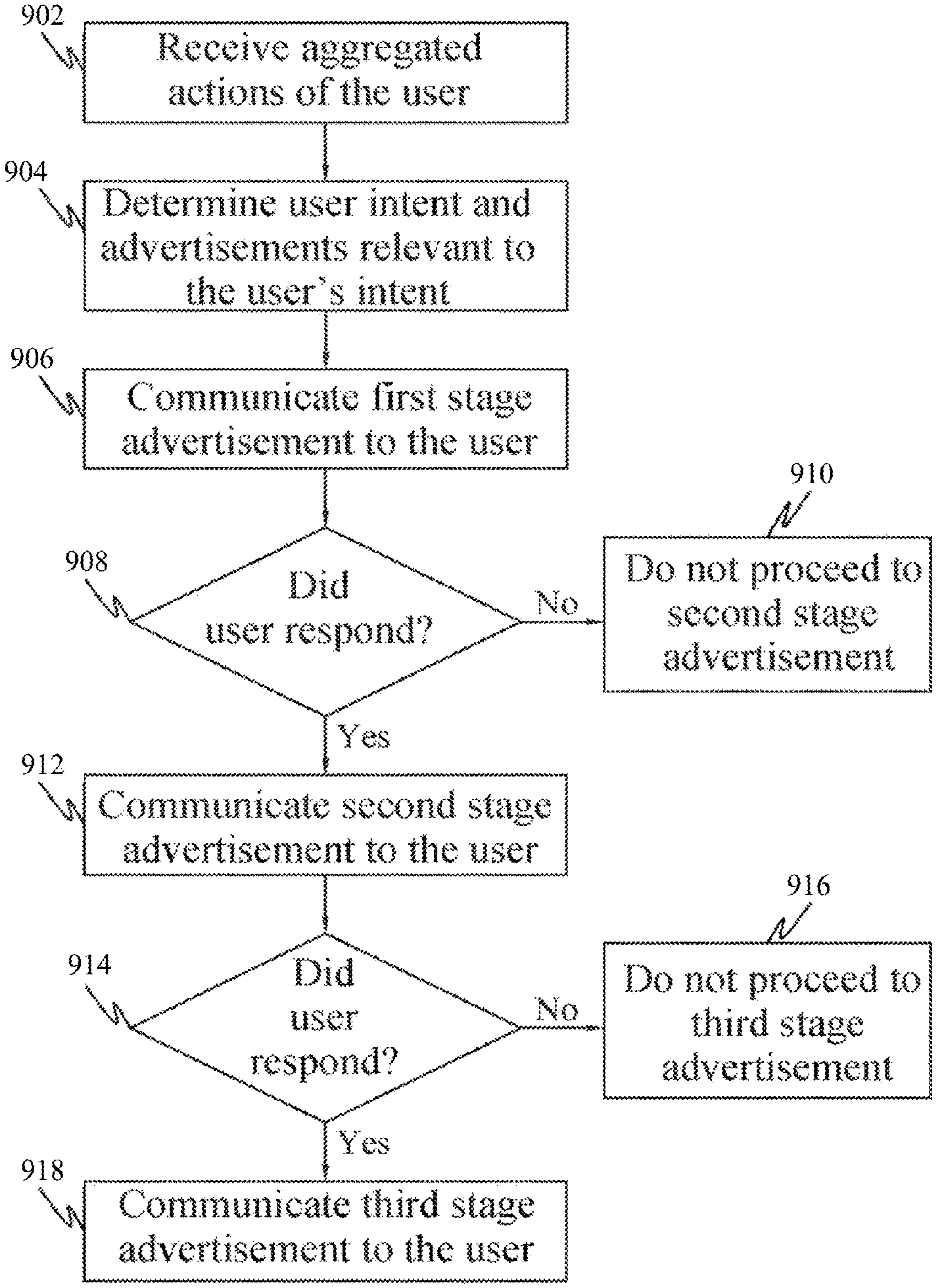
FIG. 9 depicts a flowchart of an exemplary method for communicating advertisements to a user, in accordance with an embodiment.

In an implementation, FIG. 9 depicts a flowchart of an exemplary method 900 for communicating advertisements to a user, in accordance with an embodiment. As depicted at step 902, the virtual agent server 600 may receive one or more aggregated actions of the user from one or more sources. Subsequently, the virtual agent server 600 may determine user intent based on the received aggregated actions of the user. Further, the virtual agent server 600 may communicate with one or more databases comprising advertisements to identify one or more advertisements that may be relevant to the user's intent as shown at step 904.

At step 906, the first stage advertisement may be communicated to the user. Further, at step 908, the virtual agent server 600 may determine whether the user responded to the first stage advertisement. In case the user didn't, the virtual agent server 600 may determine not to proceed to communicate a second stage advertisement to the user as shown in step 910.

In case the user did respond to the first stage advertisement, the virtual agent server 600 may determine to communicate the second stage advertisement to the user as shown at step 912.

Further, at step 914, the virtual agent server 600 may determine whether the user has responded to the second stage advertisement. In case the user didn't, the virtual agent server 600 may determine not to proceed to communicate the third stage advertisement to the user as shown at step 916.

In case the user did respond to the second stage advertisement, the virtual agent server 600 may determine to communicate a third stage advertisement to the user as shown at step 918.

In an implementation, the exemplary method 800 as described above may be used by a virtual agent server 600 in a customer service context. The virtual agent server 600 may use method 800 to act as a customer service representative and hold conversations with a user.

In an implementation, the user may be browsing online on one or more websites. Further, the user may be shown an advertisement, which may need to be encoded with information about the user to make the advertisement actionable for an organization. Further, the identity of the user may be encrypted to protect the user's privacy. Such encryption may be accomplished by using one or more methods such as one way hashes or public private key encryption mechanisms.

In an implementation, the virtual agent server 600 may identify the user by looking up one or more stored mapping information in one or more encrypted mapping between the user and the encrypted id in case the user starts to interact with the advertisement generated by the virtual agent server 600 on the social networks 710 and other external applications. The interaction with the user may be then personalized and one or more actions may be triggered for that advertisement.

In an implementation, the user information may include one or more of email-id, phone number, first name and last name combination. Further, the user information may be matched with similar identifiers on one or more social networks 710 and other external applications, among others. One or more user information may be exchanged with the social networks 710 and other external applications to make sure that the privacy of the user is protected. This may be achieved by using encrypted identifiers constructed from one or more user information.

In an implementation, the advertisement may be one or more of an actionable display, conversation or a bot advertisement, wherein the user may start interacting with the virtual agent server 600.

Figure 10:
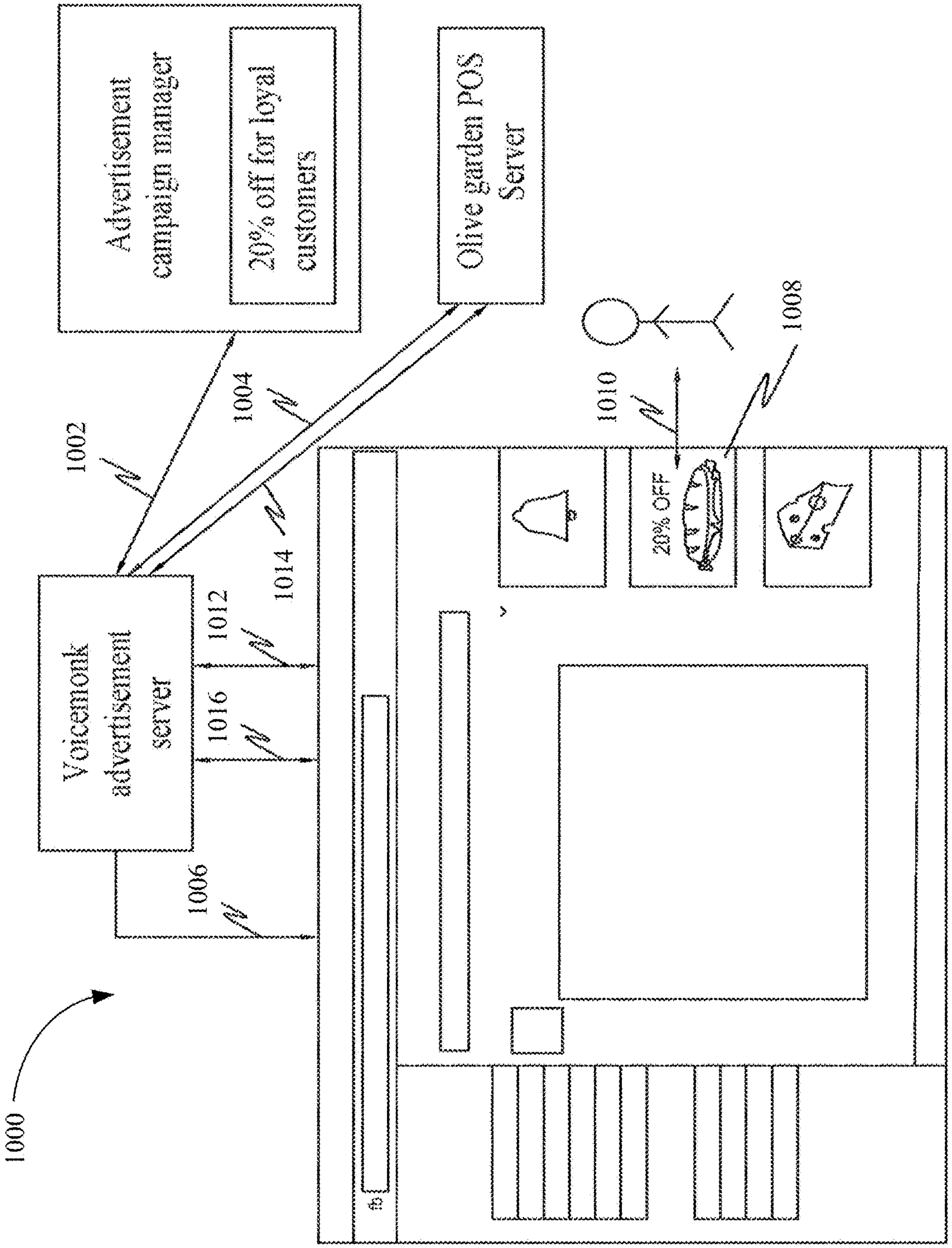
FIG. 10 depicts a flow diagram of an exemplary method for communicating advertisements to a user through actionable marketing, in accordance with an embodiment.

FIG. 10 depicts a flow diagram of an exemplary method 1000 for communicating advertisements to a user through actionable marketing, in accordance with an embodiment. As an example, Voicemonk advertisement server may provide a conversational advertisement service to an Italian Restaurant "OLIVE GARDEN". The Voicemonk advertisement server may communicate with a website being browsed by the user, an advertisement campaign manager and an OLIVE GARDEN Point of Sale (POS) server as shown in the figure.

In an implementation, a user "Tom" may be a regular customer of OLIVE GARDEN, who has not visited the restaurant recently. The Voicemonk advertisement server may be responsible for engaging Tom to make him visit the restaurant. The Voicemonk advertisement server may display an actionable advertisement by using one or more user information related to "Tom" to accomplish this. Hence, the Voicemonk advertisement server may communicate with the advertisement campaign manager regarding an advertisement which may include a 20% discount for loyal customers, as shown at step 1002. Further, the Voicemonk advertisement server may communicate with the OLIVE GARDEN POS server regarding information details of loyal customers, as shown at step 1004.

Further, in an implementation, the Voicemonk advertisement server may locate Tom and match the id information of loyal customer Tom as shown at step 1006. Subsequently, the Voicemonk advertisement server may display an advertisement to Tom through the website or application that is being used by Tom. The advertisement may include a 20% off link only valid for Tom, as shown in the website at step 1008: "It has been a while since you last came to OLIVE GARDEN. We are offering a 20% discount for today's special, 'Italian Lasagna' to loyal customers like you. Please click on this ad to accept the offer and place an order."

In an implementation, Tom may click on the order as shown at step 1010. Further, as shown at step 1012, the Voicemonk advertisement server may be able to identify the user using the method described above. Subsequently, the virtual agent server 600 may communicate Tom's order at the OLIVE GARDEN POS server, as shown at step 1014. Further, the Voicemonk advertisement server may communicate with Tom in a personalised natural language conversation as shown at step 1016. The conversation may include calling up the restaurant, making reservations, clearing one or more doubts related to an order, and placing an order at the restaurant by calling the external Point of Sale Application Programming Interface, among others.

The present invention overcomes the drawbacks of the current marketing systems, by taking into consideration any doubts and clarifications a customer may have regarding an advertisement. Thus, the present invention as discussed in this document with respect to different embodiments will be advantageous at least in optimizing the process of virtual marketing. Further, it is advantageous in providing clarifications to customers with such doubts, providing better user experience and decreasing time and effort required by customers to enquire about an advertisement. It is also advantageous in helping the user to avoid the inconvenient process of coming up with different suggestions to suit multiple people. Additional advantages not listed may be understood by a person skilled in the art in light of the embodiments disclosed above.

The invention claimed is:

1. A system comprising:

a processor;

an inverted-index graph data structure stored in a non-transitory recordable medium in communication with the processor;

a recurrent neural network trained on prior conversation interactions; and a memory in communication with the processor and storing instructions that, when executed by the processor, are configured to cause the system to:

obtain, from a user device, user permission and access profile attributes and friend attributes from a social-network interface;

generate, for each person, an identifier from at least name, date-of-birth, and location;

load, keyed by the identifier, user activity data associated with the identifier from a database, the user activity data comprising (i) search and browsing actions of the user and (ii) external records ingested via a distributed data pipeline;

determine, using a classifier trained on features including search keywords, domains, and page categories, a purchase-funnel stage associated with the identifier, the purchase-funnel stage identifying at least one of a discovery stage, a consideration stage, and an action stage;

generate a first advertisement message corresponding to the determined purchase-funnel stage;

display, on the user device during an interaction session, the first advertisement message as a part of conversation dialogues;

store the conversational dialogues in both (i) the recurrent neural network as questions and answers using sequence-to-sequence algorithms, and (ii) the inverted-index graph data structure as parent nodes representing user dialogues and corresponding child nodes representing response dialogues;

load updated interaction data generated in response to user input received during the interaction session;

apply a purchase-funnel progression model to the updated interaction data to determine whether criteria for advancing the purchase-funnel stage are satisfied;

in response to a determination that the criteria are satisfied, generate an updated advertisement message corresponding to a different purchase-funnel stage;

deliver, on the user device, the updated advertisement message, for presentation on the user device, and concurrently insert the updated advertisement message as a sequence-to-sequence query into the recurrent neural network and as a new parent node into the inverted-index graph data structure;

in response to user interaction with the updated advertisement message during the interaction session, generate, by a virtual agent server, an order request associated with the updated advertisement message; and store, in a database, each user-advertisement interaction keyed by the identifier.

2. The system of claim 1, wherein the instructions, when executed by the processor, cause the system to normalize the access profile attributes and friend attributes by lower-casing, removing whitespace, and concatenating the attributes before applying a hash function, and store a portion of a resulting digest as a database index.

3. The system of claim 2, wherein when a subsequently derived digest partially matches an existing digest, the system correlates information for the same person under the existing digest.

4. The system of claim 1, wherein the instructions, when executed by the processor, cause the system to import historic customer-service recordings and map utterances and responses of the recordings into questions and answers for the sequence-to-sequence algorithms of the recurrent neural network, or additional parent and child nodes of the inverted-index graph data structure.

5. The system of claim 1, wherein the instructions, when executed by the processor, cause the system to responsive to user permission, extract likes, dislikes, group memberships and friend feeds from the social-network interface, analyze the friend feeds by tokenizing keywords, score the tokenized keywords using term-frequency inverse-document-frequency weighting and a Bayesian sentiment classifier, and store resulting social tokens in a database keyed by the identifier.

6. The system of claim 5, wherein the instructions, when executed by the processor, cause the system to insert at least one friend-derived token selected from an employer of a friend into a placeholder of the message.

7. The system of claim 1, wherein the instructions, when executed by the processor, cause the system to call an external application programming interface to personalize an incentive included in the action-stage advertisement message.

8. A computer-implemented method comprising:

obtaining, from a user device, user permission and accessing profile attributes and friend attributes from a social-network interface;

generating for each person, an identifier from at least name, date of birth and location;

loading, keyed by the identifier, user activity data associated with the identifier from a database, the user activity data comprising (i) search and browsing actions of the user and (ii) external records ingested via a distributed data pipeline;

determining, using a classifier trained on features including search keywords, domains, and page categories, a purchase-funnel stage associated with the identifier, the purchase-funnel stage identifying at least one of a discovery stage, a consideration stage, and an action stage;

generating a first advertisement message corresponding to the determined purchase-funnel stage;

displaying, on the user device during an interaction session, the first advertisement message as a part of conversation dialogues;

storing the conversational dialogues in both (i) a recurrent neural network as questions and answers using sequence-to-sequence algorithms, and (ii) an inverted-index graph data structure as parent nodes representing user dialogues and corresponding child nodes representing response dialogues;

loading updated interaction data generated in response to user input received during the interaction session;

applying a purchase-funnel progression model to the updated interaction data to determine whether criteria for advancing the purchase-funnel stage are satisfied;

in response to a determination that the criteria are satisfied, generating an updated advertisement message corresponding to a different purchase-funnel stage;

delivering, on the user device, the updated advertisement message, for presentation on the user device, and concurrently inserting the updated advertisement message as a sequence-to-sequence query into the recurrent neural network and as a new parent node into the inverted-index graph data structure;

in response to user interaction with the updated advertisement message during the interaction session, generating, by a virtual agent server, an order request associated with the updated advertisement message; and storing in a database, each user-advertisement interaction keyed by the identifier.

9. The method of claim 8, further comprising normalizing the profile attributes and friend attributes by lower-casing, removing whitespace and concatenating the attributes before applying a hash function, and storing a portion of a resulting digest as a database index.

10. The method of claim 9, further comprising correlating information for the same person under the existing digest when a subsequently derived digest partially matches an existing digest.

11. The method of claim 8, further comprising importing historic customer-service recordings and mapping utterances and responses of the recordings into questions and answers for the sequence-to-sequence algorithms of the recurrent neural network, or additional parent and child nodes of the inverted-index graph data structure.

12. The method of claim 8, further comprising, responsive to user permission, extracting likes, dislikes, group memberships and friend feeds from the social-network interface, analyzing the friend feeds by tokenizing keywords, scoring the tokenized keywords using term-frequency inverse-document-frequency weighting and a Bayesian sentiment classifier, and storing resulting social tokens in a database keyed by the identifier.

13. The method of claim 8, further comprising inserting at least one friend-derived token selected from an employer of a friend into a placeholder of a message.

14. The method of claim 8, further comprising calling an external application programming interface to personalize an incentive included in an action-stage advertisement message.

15. A non-transitory computer-readable storage medium storing instructions that, when executed by one or more processors, cause the processors to perform operations comprising:

obtaining user permission and accessing profile attributes and friend attributes from a social-network interface;

generating for each person, an identifier from at least name, date of birth and location;

loading, keyed by the identifier, user activity data associated with the identifier from a database, the user activity data comprising (i) search and browsing actions of the user and (ii) external records ingested via a distributed data pipeline;

determining, using a classifier trained on features including search keywords, domains, and page categories, a purchase-funnel stage associated with the identifier, the purchase-funnel stage identifying at least one of a discovery stage, a consideration stage, and an action stage;

generating a first advertisement message corresponding to the determined purchase-funnel stage;

displaying, on the user device during an interaction session, the first advertisement message as a part of conversation dialogues;

storing the conversational dialogues in both (i) a recurrent neural network as questions and answers using sequence-to-sequence algorithms, and (ii) an inverted-index graph data structure as parent nodes representing user dialogues and corresponding child nodes representing response dialogues;

loading updated interaction data generated in response to user input received during the interaction session;

applying a purchase-funnel progression model to the updated interaction data to determine whether criteria for advancing the purchase-funnel stage are satisfied;

in response to a determination that the criteria are satisfied, generating an updated advertisement message corresponding to a different purchase-funnel stage;

delivering, on the user device, the updated advertisement message, for presentation on the user device, and concurrently inserting the updated advertisement message as a sequence-to-sequence query into the recurrent neural network and as a new parent node into the inverted-index graph data structure;

in response to user interaction with the updated advertisement message during the interaction session, generating, by a virtual agent server, an order request associated with the updated advertisement message; and storing each user-advertisement interaction keyed by the identifier.

16. The computer-readable storage medium of claim 15, further storing instructions that cause the processors to normalize the profile attributes and friend attributes by lower-casing, removing whitespace and concatenating the attributes before applying a hash function, and storing a portion of a resulting digest as a database index.

17. The computer-readable storage medium of claim 15, further storing instructions that cause the processors to correlate information for the same person under the existing digest when a subsequently derived digest partially matches an existing digest.

18. The computer-readable storage medium of claim 15, further storing instructions that cause the processors to import historic customer-service recordings and map utterances and responses of the recordings into questions and answers for the sequence-to-sequence algorithms of the recurrent neural network, or additional parent and child nodes of the inverted-index graph data structure.

19. The computer-readable storage medium of claim 15, further storing instructions that cause the processors to:

extract likes, dislikes, group memberships and friend feeds from the social-network interface, analyze the friend feeds by tokenizing keywords, score the tokenized keywords using term-frequency inverse-document-frequency weighting and a Bayesian sentiment classifier, and store resulting social tokens in a database keyed by the identifier in response to user permission.

20. The computer-readable storage medium of claim 15, further storing instructions that cause the processors to insert at least one friend-derived token selected from an employer of a friend into a placeholder of a message.

* * * * *